Patented Jan. 1, 1952

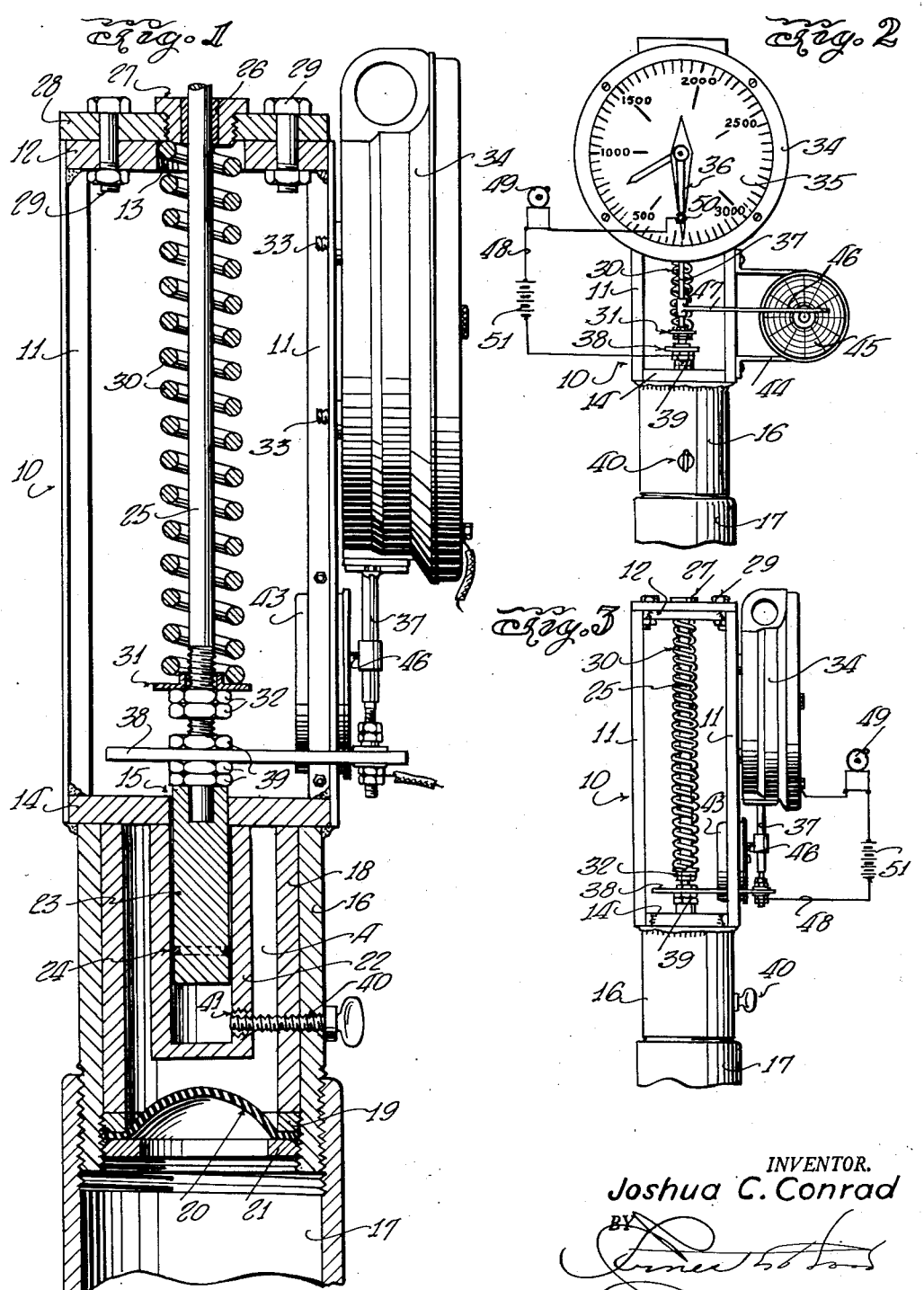

2,580,999

UNITED STATES PATENT OFFICE 2,580,999

MUD PRESSURE GAUGE

Joshua C. Conrad, Oklahoma City, Okla.; C. J. Watts executor of said Joshua C. Conrad, deceased Application March 7, 1949, Serial No. 80,019

3 Claims. (Cl. 73—392)

This invention relates to fluid pressure gauges and it has particular reference to apparatus for determining the pressure of drilling mud in wells.

The principal object of the invention is to provide the driller of a well with a visual medium by which to maintain at all times an accurate check on the pressure of drilling fluid or mud entering the well bore and to observe the performance of the mud pump. Also, the invention makes possible the foregoing without interfering with the flow of mud nor requiring its contact with moving parts likely to become impaired by reason of such contact and thus be subject to frequent repair or replacement.

Another object of the invention is to provide a mud pressure exhibiting gauge comprised of a chamber containing a fluid on which pressure is exerted by the drilling mud through a rubber diaphragm to actuate a piston operating in a cylinder submerged in the fluid and to in turn, move a pointer over a calibrated dial through the medium of a spring loaded plunger attached to the piston. By virtue of the described arrangement, pressure on the chamber fluid, which is in direct ratio to the pressure of the mud, is revealed by the position of the pointer on the dial in pounds and thus also is determined the performance of the mud pump.

With the foregoing objects in view, the invention has further reference to certain features of accomplishment which will become apparent as the description proceeds, taken in connection with the accompanying drawing wherein:

Figure 1 is a vertical sectional view of a fluid pressure gauge constructed according to the invention.

Figure 2 is a front elevational view on a reduced scale, and

Figure 3 is a side elevational view of the invention.

Continuing with a more detailed description of the drawing, reference numeral 10 denotes generally a frame made up of parallel angle irons 11 at the corners and to the upper ends of the latter is welded a plate 12 having an opening 13 in its center. At the opposite end of the frame is welded a plate 14 whose central opening 15 coincides with the opening 13 of the first mentioned plate. Further reference to these openings will be made presently.

Welded or otherwise affixed to the lower plate 14 is a tubular nipple 16 whose free end is externally threaded to be received by a pipe 17, which latter is in communication with the mud pressure line, not shown, and hence is adapted to contain drilling mud at the same pressure prevailing in the main pressure line.

Within and in close contact with the interior wall surface of the nipple 16 is a tube 18 and which serves as a spacer for the diaphragm to be presently described. The lower end of this tube terminates short of the lower end of the nipple 16 and a ring 19 is inserted into the interiorly threaded lower end of said nipple, as shown in Figure 1. A rubber diaphragm 20 is retained at its perimeter between the ring 19 and a similar ring 21 retained by the threads of the nipple and held thereby in close engagement with the diaphragm 20.

Disposed in concentric relationship with the tube 18 and also welded at its upper end to the plate 14 is a cylinder 22 in which operates a piston 23. The piston is annularly grooved to receive a packing ring 24, preferably of rubber.

A plunger 25 is reciprocable longitudinally in the frame 10 and its lower end is disposed in a socket in the end of the piston 23. The upper end of the plunger operates slidably in a bushing 26 press-fitted in an opening in a nut 27 which latter is threaded into an opening in a cap plate 28 disposed flush against the top plate 12 of the frame 10 and secured thereto by bolts 29.

The upper end of the piston 23 reciprocates in the opening 15 of plate 14 and the opening 13 in the top plate 12 receives the upper end of a coil spring 30 which surrounds the plunger 25 and, bearing at its lower end against a retaining flange 31 on the plunger, the spring resists upward displacement of the plunger as effected by the piston 23 in the manner to be presently explained.

The lower portion of the plunger 25 is threaded to receive nuts 32 against which rests the retaining flange 31 and by moving these nuts longitudinally on the plunger, the tension of the spring 30 may be varied to adjust the position of the pointer of the exhibitor dial, which will now be described.

Secured to the frame 10 by bolts 33 is a gauge housing 34 in which is mounted a dial 35, suitably calibrated to indicate presure in pounds. Operable over the dial is a pointer 36, the latter being actuated by a rod 37 in a manner similar to that set forth in the Conrad Patent No. 2,092,303, September 7, 1937, that is to say, through the medium of a rack and pinion, not shown herein.

To actuate the rod 37, an arm 38 is apertured adjacent one end to receive the plunger 25 and is held adjustably in position thereon by opposed nuts 39 threaded onto the plunger. The arm extends laterally and is connected to the lower end of the pointer actuating rod 37. Accordingly, as the piston 23 is actuated, the plunger 25 is correspondingly moved to similarly displace the rod 37 through the lateral arm 38.

The nipple 16 and tube 18 have corresponding, interiorly threaded bores which receive a screw 40. This screw continues into an opening 41 in the wall of the cylinder 22 which is likewise threaded but is slightly greater in diameter than the screw 40. The opening 41 provides a means of communication between the cylinder 22 and the chamber A defined by the tube 18 which contains a quantity of light oil or grease.

Pressure of mud or other fluid in the pipe 17 expands the diaphragm 20 and thus displaces the fluid in the chamber A into the cylinder 22 through the threaded opening 41 around the screw 40. The piston 23 is thereby moved against the resistance of spring 30 and in this manner, the pointer is moved over the dial 35 through the medium of the plunger 25, arm 38 and rod 37, to accurately reveal on the dial the pressure of the mud in pipe 17 in pounds.

Pulsations in the pressure of the mud in pipe 17 have a tendency to cause the pointer 36 to quiver and thus result in an inaccurate calculation. This condition is obviated by the threaded opening 41 whose capacity to pass fluid is adjusted by manipulating the screw 40 and which is adjusted to damp pulsations transmitted to the fluid in chamber A by fluid in the pressure line until false movements of the pointer are eliminated.

It will be observed in Figures 2 and 3 that means are provided for making a permanent record of pressure variations in the flow of mud. This means consists of a clock 43 supported by a bracket 44 attached to and extending laterally from the frame 19. The clock operates a circular chart 45 and scribing on the chart is a stylus 46 carried by an arm 47 which latter is attached to the pointer actuating rod 37. Thus, as the chart is revolved by the clock and the plunger 25 actuates the pointer arm, the stylus will be moved to scribe on the chart a continuous line reflecting pressure variations on the mud line.

When the pressure of mud becomes excessive, an audible signal is sounded. This signal consists of an electric circuit 48 in which is incorporated a signal 49. When the pointer 36 moves to a predetermined position on the dial 35 a contact 50 is closed through a source 51 of electrical energy to energize the circuit and thus actuate the signal 49.

Manifestly, the construction as shown and described is capable of some modification and such modification as may be construed to fall within the scope and meaning of the appended claims is also considered to be within the spirit and intent of the invention.

What is claimed is:

1. A drilling mud pressure exhibitor comprising a frame, a plunger reciprocable longitudinally in said frame, a tubular nipple affixed to said frame at one end and connected at its opposite end to a mud pressure line, a tube disposed in said nipple defining a fluid filled chamber whose walls are flush with the walls of said nipple and whose lower end terminates short of the lower end of said nipple, a pair of rings threaded into the said opposite end of said nipple, one of which rings bears against the lower end of said tube, a diaphragm interposed between and held by said rings adapted to separate the mud in said pressure line from the fluid in said chamber and effective to displace said fluid in accordance with variations in mud pressure in said pressure line, a cylinder concentrically arranged within said chamber secured at its upper end to said frame and having an opening to receive said displaced fluid, a piston attached to said plunger and adapted to be actuated in said cylinder by said displaced fluid, spring means resisting movement of said plunger and means attached to and actuated by said plunger for visibly exhibiting variations in pressure of said mud.

2. Apparatus for exhibiting variations in the pressure of mud in a drilling mud pressure line, comprising a frame, a tubular nipple affixed at its upper end to said frame and detachably connected at its lower end to said pressure line, a tubular chamber removably disposed in said nipple and containing fluid, a diaphragm, retaining rings threaded into the lower end of said nipple to hold said diaphragm against the lower end of said chamber to separate the mud in said line from the fluid in said chamber, said diaphragm being further effective to displace the fluid in said chamber in direct ratio to variations in pressure in said pressure line, a cylinder in said chamber having an adjustable opening through which said displaced fluid enters said cylinder, a piston actuated by said fluid in said cylinder and means in said frame responsive to movements of said piston for exhibiting the variations in said mud pressure.

3. A fluid pressure gauge comprising a frame, a nipple affixed to said frame and adapted to be connected to a pressure line, a tubular chamber within said nipple containing fluid, a diaphragm separating the fluid in said chamber from the fluid in said pressure line, means for holding said diaphragm against the lower end of said chamber, a cylinder in said chamber having a port through which the fluid in said chamber is displaced by pressure exerted on said diaphragm by fluid in said pressure line, a piston actuated in said cylinder by said displaced fluid, means for varying the capacity of said port in said cylinder to damp pulsations transmitted to the chamber fluid by the fluid in the pressure line, and means in said frame for translating the movements of said piston to reveal in pounds the variations in pressure of fluid in said pressure line.

JOSHUA C. CONRAD.

REFERENCES CITED

The following references are of record in the file of this patent:

UNITED STATES PATENTS

| Number | Name | Date |
|---|---|---|
| 142,128 | Sewell | Aug. 26, 1873 |
| 1,811,326 | Mueller | June 23, 1931 |
| 2,216,374 | Martin | Oct. 1, 1940 |
| 2,223,913 | Johnston | Dec. 3, 1940 |
| 2,317,073 | Martin | Apr. 20, 1943 |

FOREIGN PATENTS

| Number | Country | Date |
|---|---|---|
| 2,742 of 1875 | England | Feb. 3, 1876 |
| 916,664 | France | Dec. 12, 1946 |